United States Patent [19]

Suzuki et al.

[11] Patent Number: 4,629,720

[45] Date of Patent: Dec. 16, 1986

[54] SUBSTANCE FOR REVERSIBLY ABSORBING AND DESORBING HYDROGEN

[75] Inventors: Jo Suzuki; Masaaki Abe; Tamotu Yamaguchi; Shotaro Terazawa, all of Tokyo, Japan

[73] Assignee: Suzuki Shokan Co., Ltd., Tokyo, Japan

[21] Appl. No.: 801,707

[22] Filed: Nov. 26, 1985

[30] Foreign Application Priority Data

Dec. 4, 1984 [JP] Japan ................. 59-256126

[51] Int. Cl.$^4$ ................. C01B 6/00; C01B 6/24
[52] U.S. Cl. ................. 502/400; 423/645; 423/648 R
[58] Field of Search ............. 502/400; 423/645, 648 R

[56] References Cited

U.S. PATENT DOCUMENTS

| | | | |
|---|---|---|---|
| 3,135,697 | 6/1964 | Simnad et al. | 423/645 |
| 3,382,106 | 5/1968 | Jung et al. | 423/648 |
| 3,720,751 | 3/1973 | Van Houten | 423/645 |
| 3,720,752 | 3/1973 | Van Houten | 423/645 |
| 4,163,666 | 8/1979 | Shaltiel et al. | 423/648 R |
| 4,358,429 | 11/1982 | Mendelsohn et al. | 423/648 R |
| 4,375,257 | 3/1983 | Bruning et al. | 423/648 R |
| 4,555,395 | 11/1985 | Sirovich et al. | 423/648 R |

FOREIGN PATENT DOCUMENTS

| | | | |
|---|---|---|---|
| 664656 | 6/1963 | Canada | 423/645 |
| 2419458 | 11/1979 | France | 423/648 R |
| 202455 | 12/1982 | Japan | 423/645 |

*Primary Examiner*—John Doll
*Assistant Examiner*—Wayne A. Langel
*Attorney, Agent, or Firm*—Pollock, VandeSande & Priddy

[57] ABSTRACT

A substance for reversibly sorbing and desorbing hydrogen is disclosed. The substance comprises a complex dispersing 0.8–20% by weight of one or more than two oxides selected from La, Ce, Nd, Pr, Sm and Eu into $ZrV_x$ ($0.01 \leq x \leq 0.7$).

9 Claims, 3 Drawing Figures

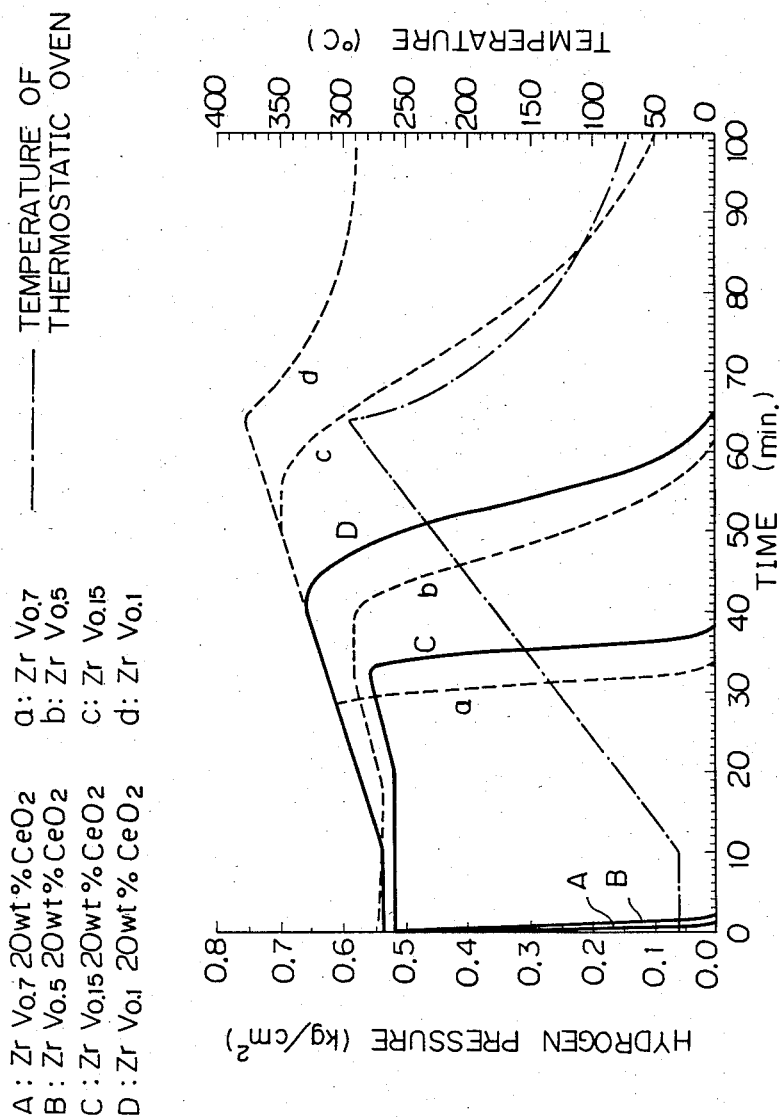

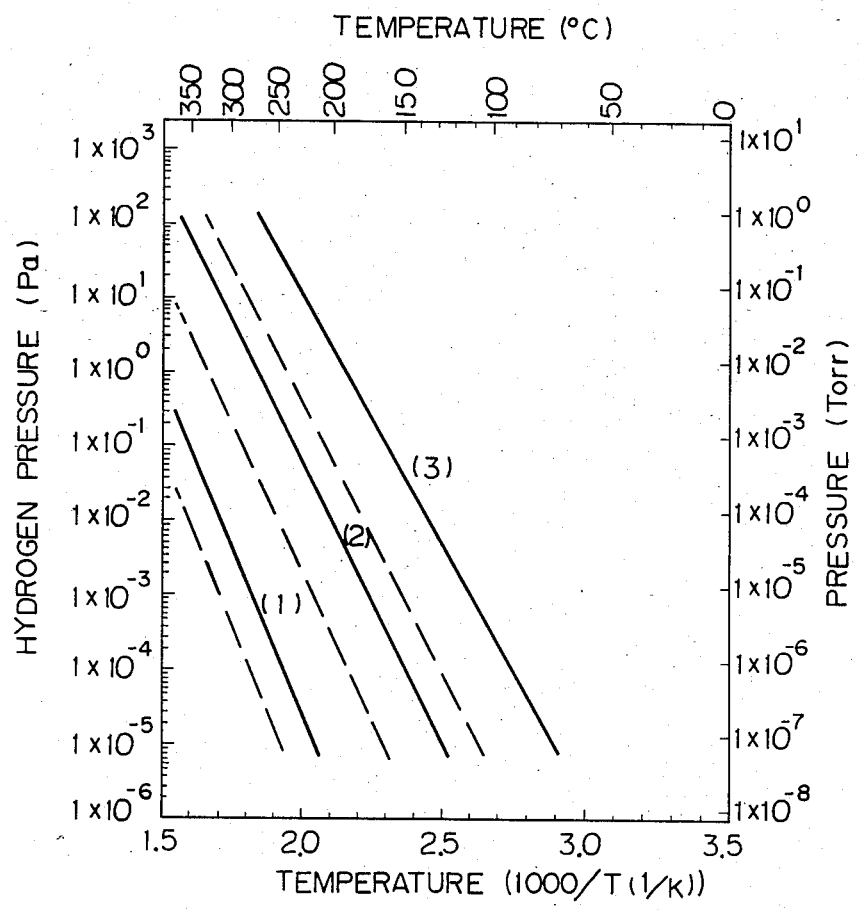

SUBSTANCE FOR REVERSIBLY ABSORBING AND DESORBING HYDROGEN

BACKGROUND OF THE INVENTION

1. Field of the Invention

The present invention relates to a substance for reversibly absorbing and desorbing hydrogen, and its isotope, particularly a reversibly hydrogen and its isotope absorbing-desorbing substance which is easy in hydrogenation and large in hydrogen absorbing and desorbing rate, more particularly, to a reversibly hydrogen and it's isotope absorbing-desorbing substance with a comparatively high hydride composition and showing a lower equilibrium pressure than an atmospheric pressure at a temperature of less than 300 ° C., and also for getting the other gasses.

Hitherto, as a substance showing a lower hydrogen dissociation pressure than an atmospheric pressure at a temperature of less than 300° C. among hydrogen getting materials, Ti, Zr, Hf and the like have been known. However, these metals are covered with strong oxides and nitrides, so that in order to obtain a hydrogen-gettable clean active surface, there is required a pretreatment for once sublimation by a sputtering method or heat-treatment at a high temperature of 700°-1,000° C.

Recently, there has been tried improvement of a pretreatment such as activation by adding 2nd, 3rd, 4th, ... elements to these metals to form an alloy, and controlling the hydrogen dissociation pressure characteristic by adding the 2nd, 3rd and 4th elements, or enlarging a reversible absorbing-desorbing rate of hydrogen.

However, among these metals, Zr-Al, Zr-Ni alloys, for instance, should be treated with heat-treatment or activation at a high temperature such as 450°-750° C., and even if Zr-V alloy can reversibly absorb and desorb hydrogen without an initial activation treatment, if the alloy is exposed to hydrogen gas of about 0.5 kg/cm$^2$ when a temperature of initially absorbing hydrogen is $ZrV_{0.15}$, a temperature is high such as about 230° C. and an absorbing rate at that time is slow. Further, there is a viscosity to some extent and comparative solid, so that it is difficult to adjust this alloy to a desired size, that is, cutting and crushing.

Further, there has also been known intermetallic compound Zr-V-O and the like stabilized by oxygen, but there are such disadvantages that an activation treatment is required and regulation of a sample grain size is difficult because of hard alloy. There have been known to control a hydrogen dissociation pressure, to regulate a sample grain size and to improve characteristics to gas other than hydrogen gas by adding the 4th and 5th elements to an alloy stabilized with oxygen and forming an intermetallic compound such as Zr-Ti-V-Fe-O, but with the increase of kinds of addition elements, it has been difficult to regulate the substance to a desired composition.

SUMMARY OF THE INVENTION

The present invention has studied and examined reversibly hydrogen absorbing-desorbing materials showing a lower hydrogen equilibrium pressure than an atmospheric pressure with a comparatively high hydride composition at a temperature of less than 300° C. and the material having a low temperature when initially absorbing hydrogen and a sufficiently quick rate of absorbing and desorbing hydrogen by excluding various problems inherent to these prior materials. As a result, the inventor has found that the object can be achieved by dispersing a specified amount of a certain kind of rare earth oxide into ZrV having a specified composition and forming a complex.

Therefore, an object of the invention is to provide a reversible hydrogen absorbing-desorbing substance showing a lower hydrogen equilibrium pressure than an atmospheric pressure at a temperature of less than 300° C. in a comparatively high hydrogenation composition having a large hydrogenation reaction rate without requiring any initial activation treatment.

According to the invention, there is provided a substance for reversibly absorbing and desorbing hydrogen comprising a complex dispersed 0.8-20% by weight of an oxide of more than one element selected from La, Ce, Nd, Pr, Sm, Eu into $ZrV_x$ ($0.01 \leq x \leq 0.7$).

In this invention, zirconium-vanadium as a matrix should be $ZrV_{0.01-0.7}$ in composition.

The substance of this invention increases the activity to hydrogen gas as the V composition is increased as well as the mother alloy, and has a property of varying temperature-hydrogen equilibrium pressure-composition characteristic. When this composition is smaller than the above range, the effect of increasing the activity to hydrogen gas is not so conspicuous, so that a desired object cannot be attained, and when the composition exceeds the above range, it is not preferable because the alloy has a high hydrogen equilibrium pressure at a comparatively low temperature in comparatively high hydrogenation composition.

The oxides of the elements dispersed in the matrix are one or more than two oxides selected from La, Ce, Nd, Pr, Sm, Eu, and the amount thereof is 0.8-20% by weight.

The substance of this invention has such property that the activity to hydrogen gas is increased as the addition amount of the rare earth oxide increases and the temperature-hydrogen equilibrium pressure characteristic is scarcely changed, but when the addition amount does not satisfy the above range, the effect of increasing the activity is not remarkable, and when the amount exceeds the above range, there is no more effect to the activity and the hydrogen absorption amount is only reduced, so that neither cases are preferable.

It is preferable from the stability of efficiency that the oxides of these elements are in the most stable oxidation condition, that is, $La_2O_3$, $CeO_2$, $Nd_2O_3$, $Pr_6O_{11}$, $Sm_2O_3$, $Eu_2O_3$, but there is no particular limitation but oxides of low valence or non-stoichiometric oxidation condition or their mixed condition is also preferable.

As means for manufacturing the substance of the invention, various methods are employed, but the most preferable method is to regulate high pure zirconium and high pure vanadium and a mixture of one or more than two rare earth oxides mentioned above (inclusive of Misch metal oxide) to form respective predetermined compositions and to act dissolve them in an inert air current such as argon and the like.

Alternatively, there are such methods that rare earth oxides are not directly mixed but rare earth pure metal is mixed and melted in an oxidizing atmosphere, and that a small amount of oxide such as V or Zr is mixed and melted.

Further, the substance according to the invention can extremely easily get impure gas such as oxygen, nitrogen, carbon monoxide, carbon dioxide, methane, steam and the like other than hydrogen gas. In addition, the substance according to the invention can easily grind as compared with Zr-V as a matrix, and not too brittle in general, and has excessive viscosity.

From these results, the substance according to the invention does not require any activation treatment in case of the initial hydrogen even in any composition, and a hydrogenation rate at that time is large and a reversible absorbing-desorbing rate is advantageously large.

Further, the reversible hydrogen absorbing-desorbing substance of this invention has various advantages such that grinding is easy, the temperature condition and the like in case of the initial hydrogenation is mitigated without almost changing the temperature-pressure-composition characteristic of the mother alloy different from the alloy improvement by the conventional 3rd element addition, and the reaction rate is quickened, and further other impure gas is got.

With these advantages, the reversible hydrogen absorbing-desorbing substance of this invention can be used for refining and separation of hydrogen gas, hydrogen gas pressure control of vacuum machines and the like, or hydrogen gas getter including isotope and non-volatile getter and the like.

BRIEF DESCRIPTION OF THE DRAWINGS

FIGS. 1 and 2 are characteristic diagrams showing initial activity of the substance for reversibly absorbing and desorbing hydrogen according to the present invention, and FIG. 3 is a diagram showing equilibrium hydrogen pressure to temperature characteristics of the substance for reversibly absorbing and desorbing hydrogen according to the present invention in case of changing hydrogen composition of the hydride.

DETAILED EXPLANATION OF THE PREFERRED EMBODIMENTS

Figure 1:
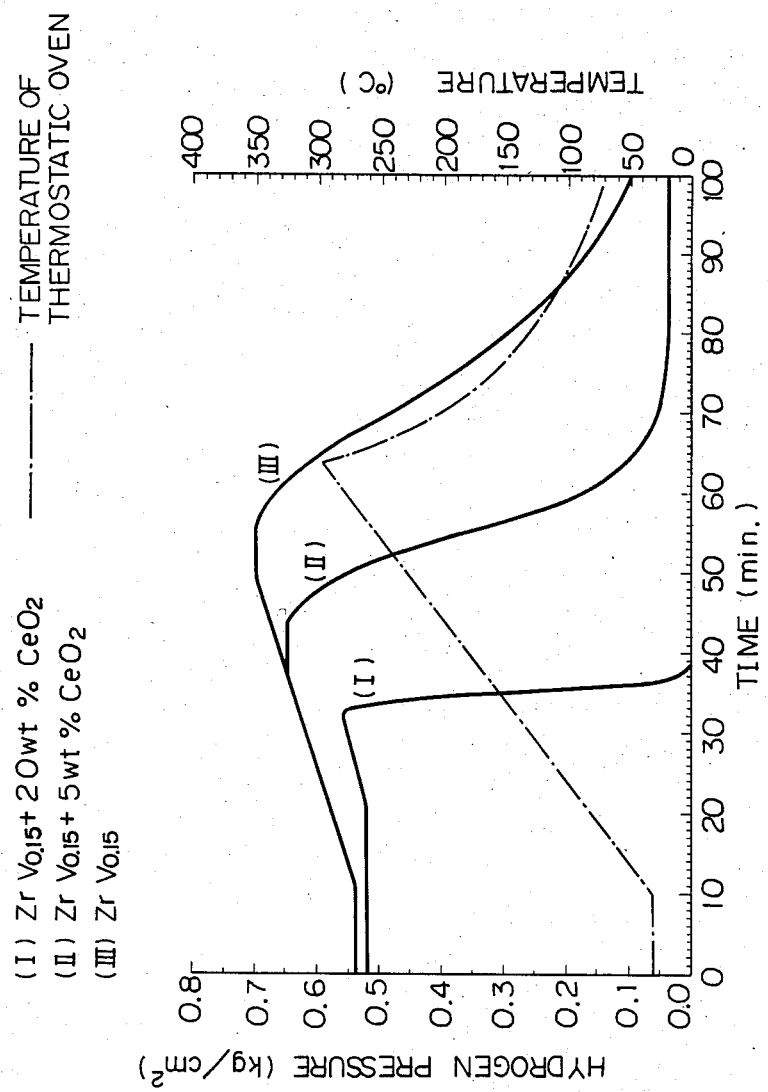

The invention will be explained by referring to examples hereinafter.

These examples are described with preferable specified compositions and other conditions, but these examples are an illustration only and the invention is not limited to these examples.

EXAMPLES 1-33

In order to form compositions shown in Table 1, respectively, there were used Zr metal powder (purity:-more than 99.7%), V metal piece (purity:more than 99.7%), $Ce_2O_3$ (purity:more than 99.0%), $CeO_2$ (purity:more than 99.0%), $Nd_2O_3$ (purity:more than 99.0%), $Pr_6O_{11}$ (purity:more than 99.0%), $Sm_2O_3$ (purity:more than 99.0%), $Eu_2O_3$ (purity:more than 99.0%) and mixed rare earth oxide (consisting of 30 wt % of $La_2O_3$, 50 wt % of $CeO_2$, 15 wt % of $Nd_2O_3$, 4 wt % of $Pr_6O_{11}$ and 1 wt % of $Sm_2O_3$), respectively, arc melted in an argon air current and regulated into a reversible hydrogen absorbing-desorbing material.

The thus obtained material was ground into 20-40 meshes, weight 4 g, charged in a hydrogen absorbing-desorbing reactor, vacuum exhausted to $10^{-2}$ Torr in the reactor, introduced hydrogen having 99.9999% purity into the reactor with a pressure of about 0.5 kg/cm², the material temperature was maintained at 30° C. for 10 minutes the temperature was raised from 30° C. to 300° C. at a rate of 5° C./min, and by measuring the sample temperature and the pressure in the reactor, the temperature that the sample was started to absorb hydrogen and the initial hydrogen absorbing rate were examined. Thus, the indices of the hydrogen absorption starting temperature and the absorbing rate at the time of the initial hydrogen absorption are as shown in Table 1. Further, the saturated hydrogen absorbing amount at the temperature of starting absorption of initial hydrogen in each sample (converted into STP) is as shown in Table 1.

FIG. 1 is a graph showing the time change of a hydrogen pressure in a reactor when materials of Example No. 22 (solid line (I), Example No. 14 (solid line (II)) and $ZrV_{0.15}$ (solid line (III)) as mother alloy thereof and ground to 20-40 meshes, charged in the above reactor, after vacuum exhausted to $10^{-2}$ Torr in the reactor, a hydrogen pressure of 0.5 kg/cm² is given, 30° C. is maintained for 10 minutes, and the temperature is raised to 300° C. at a rate of 5° C./min.

In FIG. 1, the abscissa shows time, the ordinate shows a pressure in a reactor at that time by a solid line and a temperature in the vicinity of a sample at that time by a one-dot line.

FIG. 2 is a graph showing the time change of a hydrogen pressure when testing materials of Example No. 32 (solid line A), Example No. 29 (solid line B), Example No. 22 (solid line C), Example No. 8 (solid line D) and respective mother alloys $ZrV_{0.7}$ (broken line a) and $ZrV_{0.5}$ (broken line b), $ZrV_{0.15}$ (broken line c) and $ZrV_{0.1}$ (broken line d) under the same condition as in the case shown in FIG. 1.

In FIG. 2, the abscissa shows time, the ordinate shows a pressure in a reactor at that time by a solid-broken line, and a sample temperature by one-dot line.

FIG. 3 is a graph showing the hydrogen pressure temperature characteristic of a sample measured by grinding a material of Example No. 22 into 20-40 meshes, weight 4 g in a vacuum measuring hydrogen absorbing-desorbing container, continuously heating and vacuum exhausting the whole container at 250° C. for 48 hours with the use of a cryopump, thereafter sealing a sample system from the exhaust system, introducing predetermined hydrogen gas at a room temperature and absorbing to the sample, then raising a temperature from the room temperature to about 350° C. by balancing the hydrogen pressure, and returning to the room temperature in the same manner.

In FIG. 3, the abscissa shows a hydrogen pressure in the container charged said sample therein, that is, shows an equilibrium hydrogen pressure of said sample at that temperature, and the ordinate shows a sample temperature at that time (shown by (1000/T (1/k)) and (°C.)).

In FIG. 3, the solid line shows the time of absorbing hydrogen and the broken line shows the time of dissociating hydrogen, wherein (1) shows that the hydrogen content in said hydride is 5% of the saturated hydrogen absorbing amount, (2) shows 100%, and (3) shows 15%, respectively. Each example extremely quickly absorbs and desorbs hydrogen to reach equilibrium, and shows the hydrogen pressure-temperature characteristic as shown in FIG. 3.

Further, in case of this pressure measurement, the pressure range from $10^{-5}$ to $10^{-2}$ Pa carries partial pressure measurement of hydrogen gas, and the pressure range higher than $10^{-2}$ Pa carries total pressure measurement with the use of an ionizer vacuum meter.

Property of Absorption of CO-N$_2$

The material of Example No. 22 was ground into 20–40 meshes, weighed 4 g and contained in a stainless vacuum measurement hydrogen absorbing-desorbing container (A) and the sample was not contained in said container (B). Both (A) and (B) were continuously heated and vacuumed at 150° C. for 24 hours with the use of a cryopump and back to a room temperature, sealed from the exhaust system, and examined the time change of respective CO-N$_2$ partial pressures within said containers (A) and (B), and as a result, at a room temperature of 23° C., the container (A) shows the increase of CO-N$_2$ component at a ratio of $7.2 \times 10^{-10}$ Torr l/sec, and the container (B) shows the increase of CO-N$_2$ at a ratio $1.7 \times 10^{-9}$ Torr l/sec. Therefore, even at a room temperature of 23° C., said sample absorbs the CO-N$_2$ content at an absorbing rate of $9.6 \times 10^{-10}$ Torr l/sec. Further, temperatures of both the containers (A) and (B) raised from 25° C. to 250° C. at a rate of 1.5° C./min, and the time change of the CO-N$_2$ partial pressure was examined in the same manner as described above, and as a result, the container (A) shows $2 \times 10^{-4}$ Pa at a room temerature and a partial pressure of $1.2 \times 10^{-5}$ Pa at 250° C., and the container (B) shows $2 \times 10^{-4}$ Pa at a room temperature and $2.9 \times 10^{-2}$ Pa at 250° C. Therefore, it means that said sample absorbs the CO-N$_2$ component of $1.2 \times 10^{-4}$ Torr l/sec during this period. Further, the temperature when the CO-N$_2$ partial pressure is reduced in the container (A) is about 40° C.

O$_2$ Partial Pressure

O$_2$ partial pressure is investigated by leaking a small amount of oxygen in the container in a temperature range from the room temperature to 250° C. For said sample (A), O$_2$ partial pressure was reduced to about $1 \times 10^{-7}$ Pa within one minute.

ZrV$_{0.15}$ Nd$_2$O$_3$ 10 wt % and ZrV$_{0.15}$Pr$_6$O$_{11}$ 10wt % are not shown in Table 1 as examples, but can be expected that it is possible to obtain the same effect as that examples shown in Table 1.

Moreover, the following materials are also not shown in Table 1, but can be expected that it is possible to obtain the same effect as that of examples shown in Table 1.

ZrV$_{0.15}$La$_2$O$_3$ p wt %, CeO$_2$ q wt %
ZrV$_{0.15}$La$_2$O$_3$ p wt %, Nd$_2$O$_3$ q wt %
ZrV$_{0.15}$La$_2$O$_3$ p wt %, Pr$_6$O$_{11}$ q wt %
ZrV$_{0.15}$CeO$_2$ p wt %, Sm$_2$O$_3$ q wt %
ZrV$_{0.15}$CeO$_2$ p wt %, Eu$_2$O$_3$ q wt %
ZrV$_{0.15}$Nd$_2$O$_3$ p wt %, Pr$_6$O$_{11}$ q wt %
ZrV$_{0.15}$Sm$_2$O$_3$ p wt %, Eu$_2$O$_3$ q wt %
(In the above materials, $0.8 \leq p+q \leq 20$)
ZrV$_{0.15}$La$_2$O$_3$ p wt %, CeO$_2$ q wt % Sm$_2$O$_3$ r wt %
(In this material, $0.8 \leq p+q+r \leq 20$)
ZrV$_{0.15}$La$_2$O$_3$ p wt %, CeO$_2$ q wt % Sm$_2$O$_3$ r wt %, Eu$_2$O$_3$ s wt %
(In this material, $0.8 \leq p+q+r+s \leq 20$)
ZrV$_{0.15}$La$_2$O$_3$ p wt %, CeO$_2$ q wt % Nd$_2$O$_3$ r wt %, Sm$_2$O$_3$ s wt % Eu$_2$O$_3$ t wt %
(In this material, $0.8 \leq p+q+r+s+t \leq 20$)

TABLE 1

| example number | material (substance) composition | | hydrogen absorbing amount (cc/g) | temperature (°C.) | indices of absorbing rate at the time of initial hydrogen absorption |
|---|---|---|---|---|---|
| 1 | ZrV$_{0.05}$La$_2$O$_3$ | 1% by weight | 198 | 260 | less than 0.05 kg/cm$^2$ within 180 min. |
| 2 | ZrV$_{0.05}$CeO$_2$ | 1% by weight | 198 | 260 | less than 0.05 kg/cm$^2$ within 180 min. |
| 3 | ZrV$_{0.05}$ mixed rare earth oxide | 1% by weight | 194 | 260 | less than 0.05 kg/cm$^2$ within 180 min. |
| 4 | ZrV$_{0.05}$La$_2$O$_3$ | 20% by weight | 165 | 190 | less than 0.05 kg/cm$^2$ within 30 min. |
| 5 | ZrV$_{0.05}$CeO$_2$ | 20% by weight | 164 | 180 | less than 0.05 kg/cm$^2$ within 30 min. |
| 6 | ZrV$_{0.05}$ mixed rare earth oxide | 20% by weight | 163 | 180 | less than 0.05 kg/cm$^2$ within 30 min. |
| 7 | ZrV$_{0.1}$La$_2$O$_3$ | 20% by weight | 168 | 180 | less than 0.05 kg/cm$^2$ within 25 min. |
| 8 | ZrV$_{0.1}$CeO$_2$ | 20% by weight | 167 | 180 | less than 0.05 kg/cm$^2$ within 25 min. |
| 9 | ZrV$_{0.1}$ mixed rare earth oxide | 20% by weight | 168 | 180 | less than 0.05 kg/cm$^2$ within 25 min. |
| 10 | ZrV$_{0.15}$La$_2$O$_3$ | 1% by weight | 245 | 200 | less than 0.05 kg/cm$^2$ within 50 min. |
| 11 | ZrV$_{0.15}$CeO$_2$ | 1% by weight | 242 | 190 | less than 0.05 kg/cm$^2$ within 50 min. |
| 12 | ZrV$_{0.15}$ mixed rare earth oxide | 1% by weight | 241 | 190 | less than 0.05 kg/cm$^2$ within 50 min. |
| 13 | ZrV$_{0.15}$La$_2$O$_3$ | 5% by weight | 239 | 170 | less than 0.05 kg/cm$^2$ within 30 min. |
| 14 | ZrV$_{0.15}$CeO$_2$ | 5% by weight | 236 | 170 | less than 0.05 kg/cm$^2$ within 30 min. |
| 15 | ZrV$_{0.15}$ mixed rare earth oxide | 5% by weight | 232 | 170 | less than 0.05 kg/cm$^2$ within 30 min. |
| 16 | ZrV$_{0.15}$La$_2$O$_3$ | 10% by weight | 226 | 150 | less than 0.01 kg/cm$^2$ within 5 min. |
| 17 | ZrV$_{0.15}$CeO$_2$ | 10% by weight | 223 | 150 | less than 0.01 kg/cm$^2$ within 5 min. |
| 18 | ZrV$_{0.15}$Sm$_2$O$_3$ | 10% by weight | 218 | 50 | less than 0.01 kg/cm$^2$ within 2 min. |
| 19 | ZrV$_{0.15}$Eu$_2$O$_3$ | 10% by | 216 | 50 | less than 0.01 kg/cm$^2$ |

TABLE 1-continued

| example number | material (substance) composition | hydrogen absorbing amount (cc/g) | temperature (°C.) | indices of absorbing rate at the time of initial hydrogen absorption |
|---|---|---|---|---|
| 20 | $ZrV_{0.15}$ mixed rare earth oxide | 10% by weight | 221 | 150 | within 2 min. less than 0.01 kg/cm$^2$ within 5 min. |
| 21 | $ZrV_{0.15}La_2O_3$ | 10% by weight | 210 | 140 | less than 0.01 kg/cm$^2$ within 5 min. |
| 22 | $ZrV_{0.15}CeO_2$ | 10% by weight | 210 | 140 | less than 0.01 kg/cm$^2$ within 5 min. |
| 23 | $ZrV_{0.15}Sm_2O_3$ | 10% by weight | 196 | room temperature (30) | waiting time to hydrogenation 0 min. less than 0.01 kg/cm$^2$ within 1 min. |
| 24 | $ZrV_{0.15}Eu_2O_3$ | 10% by weight | 194 | room temperature (30) | waiting time to hydrogenation 0 min. less than 0.01 kg/cm$^2$ within 1 min. |
| 25 | $ZrV_{0.15}$ mixed rare earth oxide | 10% by weight | 207 | 130 | less than 0.01 kg/cm$^2$ within 5 min. |
| 26 | $ZrV_{0.5}La_2O_3$ | 20% by weight | 227 | room temperature (30) | waiting time to hydrogenation 0 min. less than 0.01 kg/cm$^2$ within 2 min. |
| 27 | $ZrV_{0.15}CeO_2$ | 20% by weight | 220 | room temperature (30) | waiting time to hydrogenation 0 min. less than 0.01 kg/cm$^2$ within 2 min. |
| 28 | $ZrV_{0.5}La_2O_3$ | 20% by weight | 227 | room temperature (30) | waiting time to hydrogenation 0 min. less than 0.01 kg/cm$^2$ within 2 min. |
| 29 | $ZrV_{0.5}CeO_2$ | 20% by weight | 220 | room temperature (30) | waiting time to hydrogenation 0 min. less than 0.01 kg/cm$^2$ within 2 min. |
| 30 | $ZrV_{0.5}$ mixed rare earth oxide | 20% by weight | 220 | room temperature (30) | waiting time to hydrogenation 0 min. less than 0.01 kg/cm$^2$ within 2 min. |
| 31 | $ZrV_{0.7}La_2O_3$ | 20% by weight | 238 | room temperature (30) | waiting time for hydrogenation 0 min. less than 0.01 kg/cm$^2$ within 1 min. |
| 32 | $ZrV_{0.7}CeO_2$ | 20% by weight | 242 | room temperature (30) | waiting time for hydrogenation 0 min. less than 0.01 kg/cm$^2$ within 1 min. |
| 33 | $ZrV_{0.7}$ mixed rare earth oxide | 20% by weight | 240 | room temperature (30) | waiting time for hydrogenation 0 min. less than 0.01 kg/cm$^2$ within 1 min. |

What is claimed is:

1. A substance for reversibly absorbing and desorbing hydrogen, comprising a complex dispersing 0.8–20% by weight of one or more than two oxides selected from La, Ce, Nd, Pr, Sm and Eu into $ZrV_x$ ($0.01 \leq x \leq 0.7$).

2. A substance for reversibly absorbing and desorbing hydrogen as claimed in claim 1, wherein the oxide of the dispersed element contains one or more than two selected from $La_2O_3$, $CeO_2$, $Nd_2O_3$, $Pr_6O_{11}$, $Sm_2O_3$ and $Eu_2O_3$.

3. A substance for reversibly absorbing and desorbing hydrogen as claimed in claim 2, wherein the oxide of the dispersed element contains $La_2O_3$ (p % by weight) and any one of $CeO_2$, $Nd_2O_3$ and $Pr_6O_{11}$ (q % by weight) where $0.8 \leq p+q \leq 20$.

4. A substance for reversibly absorbing and desorbing hydrogen as claimed in claim 2, wherein the oxide of the dispersed element contains $CeO_2$ (p % by weight) and any one of $Sm_2O_3$ and $Eu_2O_3$ (q % by weight) where $0.8 \leq p+q \leq 20$.

5. A substance for reversibly absorbing and desorbing hydrogen as claimed in claim 2, wherein the oxide of the dispersed element contains $Nd_2O_3$ (p % by weight) and $Pr_6O_{11}$ (q % by weight) where $0.8 \leq p+q \leq 20$.

6. A substance for reversibly absorbing abd desorbing hydrogen as claimed in claim 2, wherein the oxide of the dispersed element contains $Sm_2O_3$ (p % by weight) and $Eu_2O_3$ (q % by weight) where $0.8 \leq p+q \leq 20$.

7. A substance for reversibly absorbing and desorbing hydrogen as claimed in claim 2, wherein the oxide of the dispersed element contains $La_2O_3$ (p % by weight), $CeO_2$ (q % by weight) and $Sm_2O_3$ (r % by weight), where $0.8 \leq p+q+r \leq 20$.

8. A substance for reversibly absorbing and desorbing hydrogen as claimed in claim 2, wherein the oxide of the dispersed element contains $La_2O_3$ (p % by weight), $CeO_2$ (q % by weight), $Sm_2O_3$ (r % by weight) and $Eu_2O_3$ (s % by weight), where $0.8 \leq p+q+r+s \leq 20$.

9. A substance for reversibly absorbing and desorbing hydrogen as claimed in claim 2, wherein the oxide of the dispersed element contains $La_2O_3$ (p % by weight), $CeO_2$ (q % by weight), $Nd_2O_3$ (r % by weight), $Sm_2O_3$ (s % by weight) and $Eu_2O_3$ (t %, by weight), where $0.8 \leq p+q+r+s+t \leq 20$.

UNITED STATES PATENT AND TRADEMARK OFFICE
CERTIFICATE OF CORRECTION

PATENT NO. : 4,629,720
DATED : December 16, 1986
INVENTOR(S) : Jo Suzuki, et al.

It is certified that error appears in the above-identified patent and that said Letters Patent is hereby corrected as shown below:

Column 1, line 9, change "reversibly" to --reversible--.

Column 1, line 12, change "reversibly" to --reversible--.

Column 1, line 13, change "it's" to --its--.

Column 1, bridging lines 60 and 61, change "reversibly" to --reversible--.

Column 2, line 58, delete "act".

Column 5, line 24, change "temerature" to --temperature--.

Column 6, line 9, after "but" insert --it--.

Column 6, line 11, after "that" insert --of--.

Column 6, line 13, after "but" insert --it--.

Signed and Sealed this

Eighth Day of September, 1987

*Attest:*

DONALD J. QUIGG

*Attesting Officer*  *Commissioner of Patents and Trademarks*